US012689412B2

(12) United States Patent
Wang et al.

(10) Patent No.: US 12,689,412 B2
(45) Date of Patent: Jul. 21, 2026

(54) COMMUNICATION BETWEEN A UE AND WIRELESSLY INTERCONNECTED BASE STATIONS

(71) Applicant: Google LLC, Mountain View, CA (US)

(72) Inventors: Jibing Wang, San Jose, CA (US); Erik Stauffer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 61 days.

(21) Appl. No.: 18/279,580

(22) PCT Filed: Mar. 9, 2022

(86) PCT No.: PCT/US2022/019522
§ 371 (c)(1),
(2) Date: Aug. 30, 2023

(87) PCT Pub. No.: WO2022/192379
PCT Pub. Date: Sep. 15, 2022

(65) Prior Publication Data
US 2024/0171219 A1 May 23, 2024

Related U.S. Application Data

(60) Provisional application No. 63/158,589, filed on Mar. 9, 2021.

(51) Int. Cl.
*H04B 7/024* (2017.01)
*H04W 28/08* (2023.01)

(52) U.S. Cl.
CPC ........ *H04B 7/024* (2013.01); *H04W 28/0867* (2020.05)

(58) Field of Classification Search
CPC ..................................................... H04B 7/024
(Continued)

(56) References Cited

U.S. PATENT DOCUMENTS 11,792,891 B2 * 10/2023 Li ......................... H04W 24/02
370/329
12,323,927 B2 * 6/2025 Kowalski ............ H04W 52/243
(Continued)

FOREIGN PATENT DOCUMENTS

WO        2017122977 A1     1/2017
WO        2019246446 A1     12/2019
WO        2020/142532 A1    7/2020

OTHER PUBLICATIONS

The International Search Report and Written Opinion of the International Searching Authority for International Application No. PCT/US2022/019522 mailed on Jun. 8, 2022.
(Continued)

*Primary Examiner* — Lihong Yu
(74) *Attorney, Agent, or Firm* — Womble Bond Dickinson (US) LLP

(57) ABSTRACT
A first base station communicates with a UE via the first base station and a second base station. The first base station transmits, via a radio interface to the second base station, a configuration for concurrent communication between the UE and a group of base stations including the first base station and the second base station. The first base station communicates, by processing hardware, data over the radio interface directly with the UE, and via the radio interface and the second base station.

23 Claims, 8 Drawing Sheets

200

(58) Field of Classification Search
USPC ......................................................... 375/262
See application file for complete search history.

(56)                     References Cited

U.S. PATENT DOCUMENTS

| | | |
|---|---|---|
| 2010/0265874 A1 | 10/2010 | Palanki et al. |
| 2012/0039208 A1 | 2/2012 | Aydin |
| 2014/0080501 A1 | 3/2014 | Lee et al. |
| 2015/0146680 A1 | 5/2015 | Luo et al. |
| 2016/0205715 A1 | 7/2016 | Seo |
| 2017/0230086 A1 | 8/2017 | Chen et al. |
| 2017/0331670 A1 | 11/2017 | Parkvall et al. |
| 2020/0084819 A1 | 3/2020 | Abedini et al. |
| 2020/0146109 A1 | 5/2020 | Majmundar et al. |
| 2020/0178131 A1 | 6/2020 | Wang et al. |
| 2020/0314707 A1* | 10/2020 | Sakai .................... H04W 76/27 |
| 2020/0314933 A1 | 10/2020 | Tang et al. |
| 2021/0051703 A1* | 2/2021 | Takeda .................. H04L 5/1469 |
| 2021/0068096 A1 | 3/2021 | Abedini et al. |
| 2022/0030414 A1 | 1/2022 | Wang et al. |
| 2023/0224081 A1* | 7/2023 | Chen .................... H04W 72/20 |
| | | 370/329 |

OTHER PUBLICATIONS

PCT/US2022/019522, PCT Written Opinion of the International
Preliminary Examining Authority mailed Jan. 26, 2023.
PCT/US2022/019522, PCT International Preliminary Report on
Patentability dated Apr. 11, 2023.

\* cited by examiner

Figure 1A:
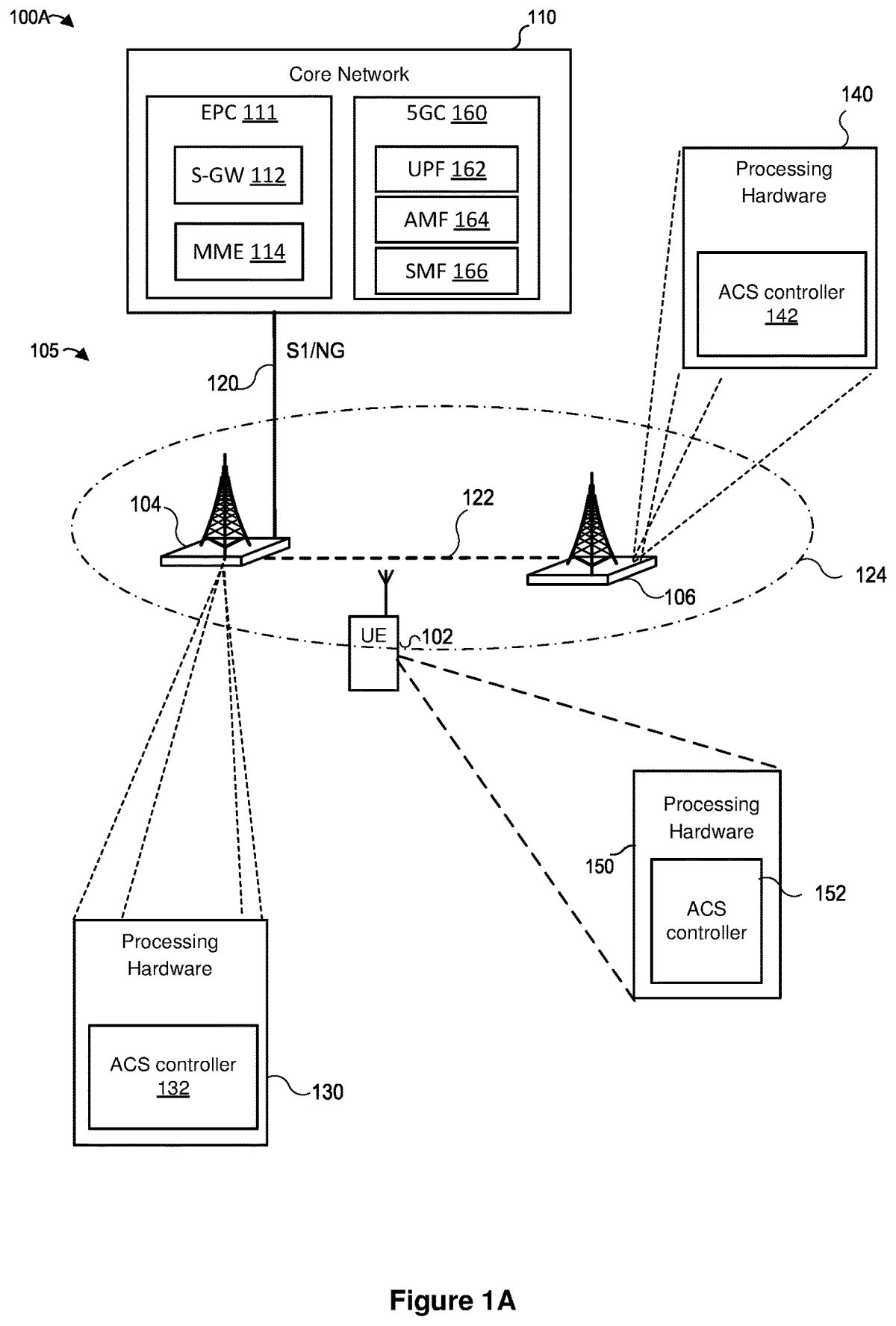

100A

110

Core Network

EPC 111

S-GW 112

MME 114

5GC 160

UPF 162

AMF 164

SMF 166

140

Processing Hardware

ACS controller 142

105

S1/NG

120

104

122

124

106

UE 102

Processing Hardware

150

ACS controller

152

Processing Hardware

ACS controller 132

Core Network

S1/NG

105

104

122

106

108

124

UE　102

400↙

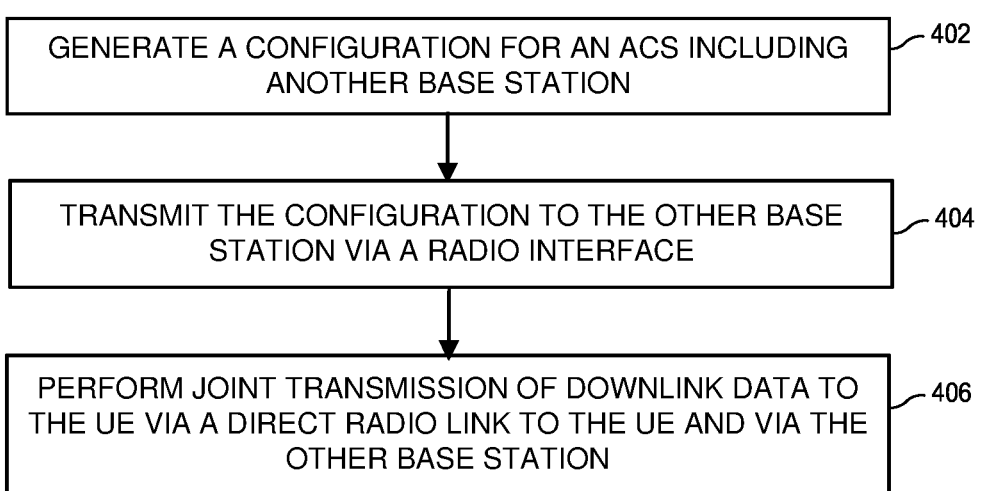

GENERATE A CONFIGURATION FOR AN ACS INCLUDING ANOTHER BASE STATION ⟞402

TRANSMIT THE CONFIGURATION TO THE OTHER BASE STATION VIA A RADIO INTERFACE ⟞404

PERFORM JOINT TRANSMISSION OF DOWNLINK DATA TO THE UE VIA A DIRECT RADIO LINK TO THE UE AND VIA THE OTHER BASE STATION ⟞406

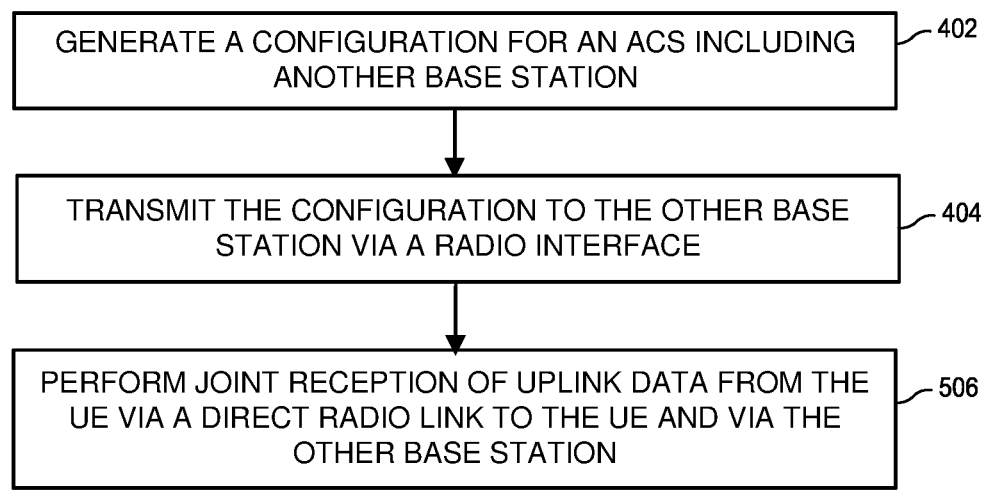

GENERATE A CONFIGURATION FOR AN ACS INCLUDING ANOTHER BASE STATION ⟞402

TRANSMIT THE CONFIGURATION TO THE OTHER BASE STATION VIA A RADIO INTERFACE ⟞404

PERFORM JOINT RECEPTION OF UPLINK DATA FROM THE UE VIA A DIRECT RADIO LINK TO THE UE AND VIA THE OTHER BASE STATION ⟞506

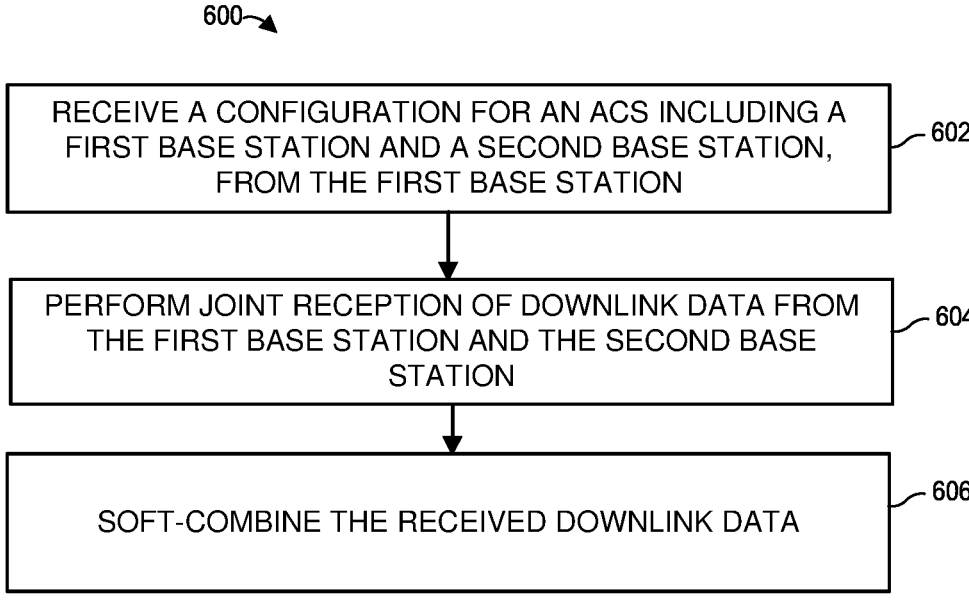

| RECEIVE A CONFIGURATION FOR AN ACS INCLUDING A FIRST BASE STATION AND A SECOND BASE STATION, FROM THE FIRST BASE STATION | 602 |

| PERFORM JOINT RECEPTION OF DOWNLINK DATA FROM THE FIRST BASE STATION AND THE SECOND BASE STATION | 604 |

| SOFT-COMBINE THE RECEIVED DOWNLINK DATA | 606 |

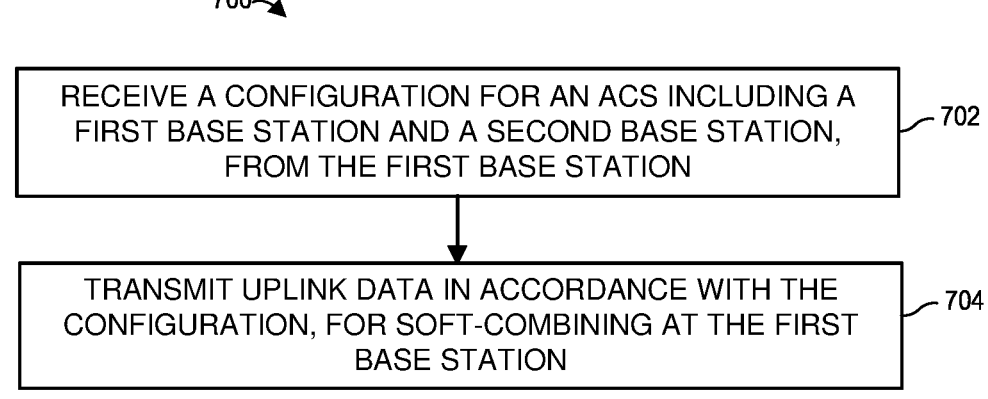

| RECEIVE A CONFIGURATION FOR AN ACS INCLUDING A FIRST BASE STATION AND A SECOND BASE STATION, FROM THE FIRST BASE STATION | 702 |

| TRANSMIT UPLINK DATA IN ACCORDANCE WITH THE CONFIGURATION, FOR SOFT-COMBINING AT THE FIRST BASE STATION | 704 |

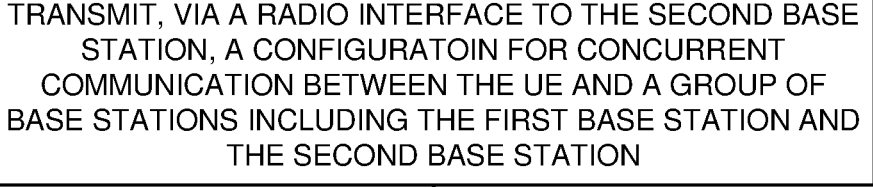

| TRANSMIT, VIA A RADIO INTERFACE TO THE SECOND BASE STATION, A CONFIGURATOIN FOR CONCURRENT COMMUNICATION BETWEEN THE UE AND A GROUP OF BASE STATIONS INCLUDING THE FIRST BASE STATION AND THE SECOND BASE STATION | 802 |

| COMMUNICATE DATA WITH THE UE VIA A RADIO LINK BETWEEN THE FIRST BASE STATION, AND VIA THE RADIO INTERFACE AND THE SECOND BASE STATION | 804 |

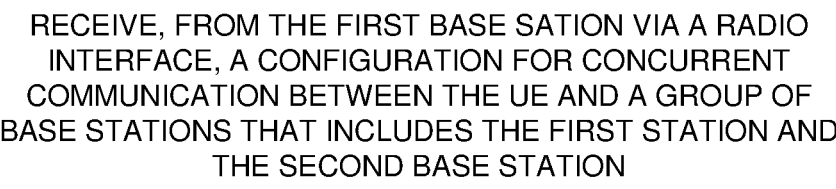

| RECEIVE, FROM THE FIRST BASE SATION VIA A RADIO INTERFACE, A CONFIGURATION FOR CONCURRENT COMMUNICATION BETWEEN THE UE AND A GROUP OF BASE STATIONS THAT INCLUDES THE FIRST STATION AND THE SECOND BASE STATION | 902 |

| PROVIDE, IN ACCORDANCE WITH THE CONFIGURATION, A DATA PATH BETWEEN THE FIRST BASE STATION AND THE UE BY (I) COMMUNICATING DATA WITH THE FIRST BASE STATION DIRECTLY VIA THE RADIO INTERFACE, AND (II) COMMUNICATING DATA WITH THE UE DIRECTLY VIA A RADIO LINK | 904 |

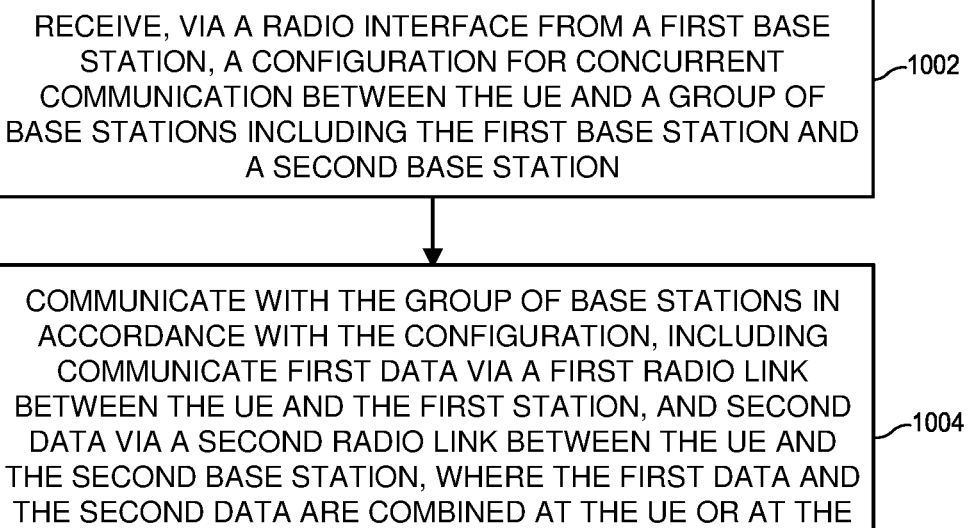

RECEIVE, VIA A RADIO INTERFACE FROM A FIRST BASE STATION, A CONFIGURATION FOR CONCURRENT COMMUNICATION BETWEEN THE UE AND A GROUP OF BASE STATIONS INCLUDING THE FIRST BASE STATION AND A SECOND BASE STATION ⟋1002

COMMUNICATE WITH THE GROUP OF BASE STATIONS IN ACCORDANCE WITH THE CONFIGURATION, INCLUDING COMMUNICATE FIRST DATA VIA A FIRST RADIO LINK BETWEEN THE UE AND THE FIRST STATION, AND SECOND DATA VIA A SECOND RADIO LINK BETWEEN THE UE AND THE SECOND BASE STATION, WHERE THE FIRST DATA AND THE SECOND DATA ARE COMBINED AT THE UE OR AT THE FIRST BASE STATION ⟋1004

Figure 10

COMMUNICATION BETWEEN A UE AND WIRELESSLY INTERCONNECTED BASE STATIONS

CROSS REFERENCE TO RELATED APPLICATION(S)

This application claims the benefit of and priority to International Application No. PCT/US2022/019522, filed on Mar. 9, 2022, and U.S. Provisional Application No. 63/158, 589, filed on Mar. 9, 2021, both of which are entitled "COMMUNICATION BETWEEN A UE AND WIRE-LESSLY INTERCONNECTED BASE STATIONS" and are expressly incorporated by reference herein in their entireties.

This disclosure relates generally to wireless communications and, more particularly, to managing communications between a UE and a group of base stations, in the absence of a wired backhaul between the base stations.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An Active Coordination Set (ACS) of base stations within a radio access network (RAN) (ACS) provides and optimizes mobility management and other services to a user equipment or device (UE). An ACS can enable joint transmission and/or reception of data between the RAN and a UE so as to increase throughput and reduce error rate.

An ACS generally requires high bandwidth backhaul (Xn) between base stations. However, in some deployments, base stations do not have a high-capacity wired backhaul link (e.g., due to lack of a fiber-optic connection). Moreover, for ultra-dense deployment in the 6G+ Hz bands or THz bands, for example, fiber-based backhaul becomes even more expensive and difficult to implement. Still further, some base stations within an ACS may operate on high-altitude moving platforms.

SUMMARY

Generally speaking, a coordinating base station of this disclosure uses a wireless access link to one or more coordinated base stations to coordinate ACS formation and joint transmission and/or reception. The wireless access link operates as a backhaul, and thus the ACS operates without a wired backhaul. More particularly, the coordinating base station in some implementations operates as an Integrated Access and Backhaul (IAB)-donor, and the coordinated base station operates as an IAB-node.

An example embodiment of these techniques is a method in a first base station for communicating with a UE via the first base station and a second base station. The method includes transmitting, via a radio interface to the second base station, a configuration for concurrent communication between the UE and a group of base stations including the first base station and the second base station; and communicating, by processing hardware, data (i) over the radio interface directly with the UE, and (ii) via the radio interface and the second base station.

Another example embodiment of these techniques is a method for supporting concurrent communication between a UE and a group of base stations including a first base station and the second base station, implemented in the second base station. The method includes receiving, from the first base station via a radio interface, a configuration for concurrent communication between the UE and the group of base stations; and communicating, by processing hardware and in accordance with the configuration, data between the first base station and the UE. The communicating includes communicating the data with the first base station via the radio interface, and communicating the data with the UE via a radio link between the second base station and the UE.

Yet another embodiment of these techniques is a base station including processing hardware and configured to implement one of the methods above.

Still another embodiment of these techniques is a method in a UE for communicating with a group of base stations including a first base station and a second base stations. The method includes receiving, via a radio interface, a configuration for concurrent communication between the UE and group of base stations; and communicating, by processing hardware and in accordance with the configuration. (i) first data via a first radio link between the UE and the first base station, and (ii) second data via a second radio link between the UE and the second base station, where the first data is combined with the second data at the UE or at the first base station.

BRIEF DESCRIPTION OF THE DRAWINGS

FIG. 1A is a block diagram of an example system in which a base station of this disclosure configures, via a radio interface between the base station and another base station, concurrent communication between a UE and a group of base stations;

FIG. 4 is a flow diagram of an example method for coordinating joint transmission of downlink data using an Active Coordination Set (ACS), which can be implemented in the coordinating base station of FIG. 1A;

FIG. 5 is a flow diagram of an example method for coordinating joint reception of uplink data using an ACS, which can be implemented in the coordinating base station of FIG. 1A;

FIG. 6 is a flow diagram of an example method for performing joint reception of downlink data using an ACS, which can be implemented in the UE of FIG. 1A;

FIG. 7 is a flow diagram of an example method for transmitting uplink data to an ACS, for soft-combining at a first base station, which can be implemented in UE of FIG. 1A;

FIG. 8 is a flow diagram of an example method for communicating with a UE, which can be implemented in the coordinating base station of FIG. 1A;

FIG. 9 is a flow diagram of an example method for communicating with a UE, which can be implemented in the coordinated base station of FIG. 1A; and FIG. 10 is a flow diagram of an example method for communicating with a group of base stations, which can be implemented in the UE of FIG. 1A.

DETAILED DESCRIPTION OF THE DRAWINGS

Figure 1B:
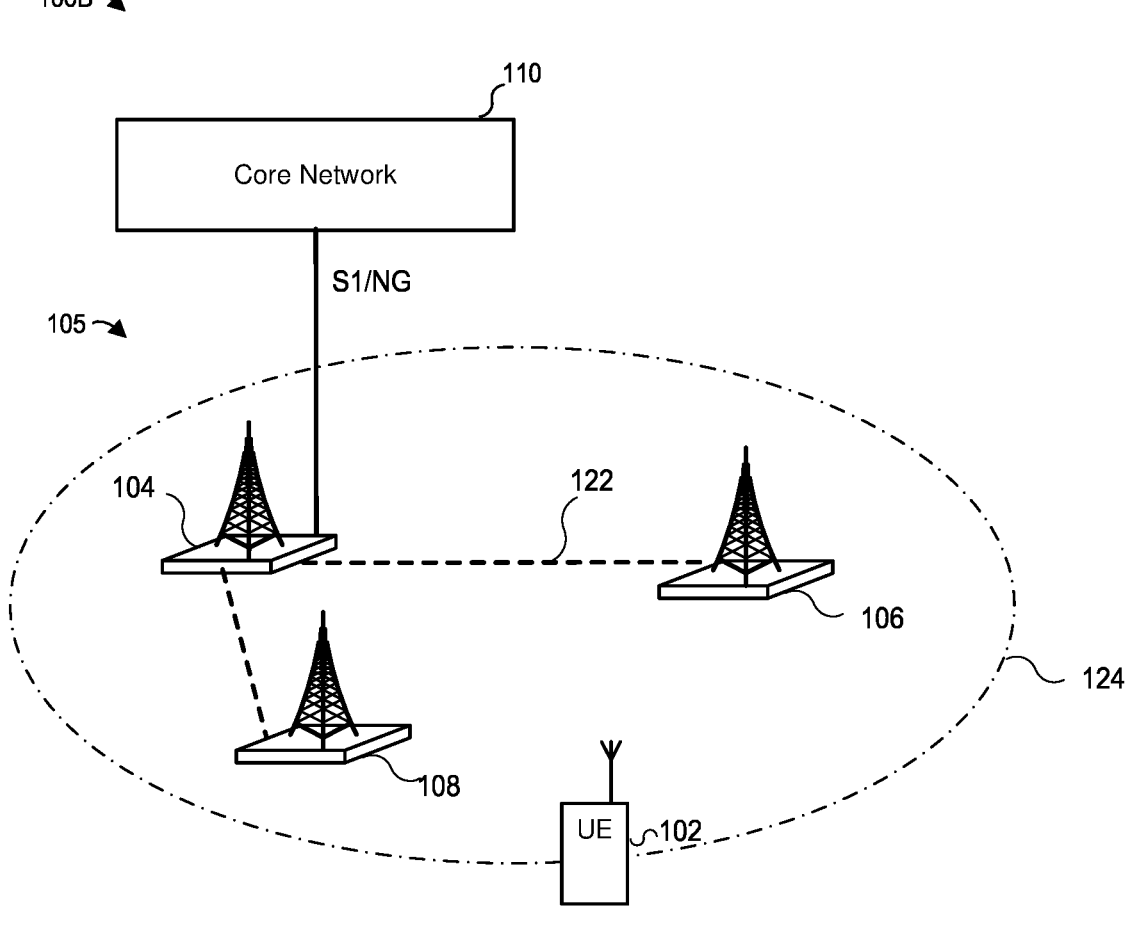
FIG. 1B is a block diagram of another example system in which a coordinating base station configures a group of three base stations for concurrent communication with a UE.

FIG. 1A illustrates an example wireless communication system 100A in which a base station 104 operates as a coordinating base station to form a group that includes the base station 104 and one or more coordinated base stations, such a base station 106. The base stations 104 and 106 are not interconnected by a wired backhaul such as X2 or Xn. The base station 104 can exchange control-plane and/or user-plane messages with the base station 106 via a radio interface. In some implementations, the base station 104 operates as an Integrated Access and Backhaul (IAB)-donor, and the coordinated base station 106 operates as an IAB-node.

The base station 104 can configure the base station 106 and a UE 102 for concurrent communications between the base stations in the group and the UE 102. For example, the base station 104 can coordinate joint transmission of data in a downlink (DL) direction to a UE 102, and/or joint reception of data in an uplink (UL) direction from the UE 102. As another example, one of the base stations in the group can operate as a master node (MN), and another base station in the group can operate as a secondary (SN) to provide dual connectivity to the UE 106. The MN can use the radio interface between the MN and the SN to temporarily provide connectivity between the UE and the SN, when the SN loses connectivity to the core network.

The base stations 104 and 106 can operate in a RAN 105, and at least the base station 104 can be connected to the core network (CN) 110 via a link 120. The base stations 104 and 106 support respective cells, which can partially overlap, so that the UE 102 can concurrently communicate with both stations. For example, each of the base stations 104 and 106 can be implemented as a next-generation Node B (gNB) and support a respective 5G NR (or simply, "NR") cell. In another implementation, one or both of the base stations 104 and 106 is an evolved node B (eNB) and supports the Evolved Universal Terrestrial Radio Access (EUTRA) cell. The base stations 104 and 106 can support any suitable same radio access technology (RAT) or different RATs.

In operation, the base station 104 establishes a wireless backhaul link 122 between the base stations 104 and 106 and configures a group 124 such as an ACS for concurrent communication with the UE 102. The base station 104 in some implementations configures the base stations 104 and 106 to operate as an IAB-donor and an IAB-node, respectively, for the purposes of exchanging information between the base stations 104 and 106. To this end, the base station 104 can use a backhaul adaptation protocol (BAP) protocol specified by 3GPP TS 38.340.

In some implementations, the CN 110 can be implemented as an evolved packet core (EPC) 111 or a fifth generation (5G) core (5GC) 160, for example. Among other components, the EPC 111 can include a Serving Gateway (S-GW) 112 and a Mobility Management Entity (MME) 114. The S-GW 112 in general is configured to transfer user-plane packets related to audio calls, video calls. Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. The UPF 162 is configured to transfer user-plane packets related to audio calls, video calls. Internet traffic, etc., the AMF 164 is configured to manage authentication, registration, paging, and other related functions, and the SMF 166 is configured to manage PDU sessions.

The base station 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes an ACS controller 132 configured to configure the ACS 124 (or another suitable type of a group of base stations) and coordinate downlink and/or uplink communication with the UE 102. Similarly, the base station 106 is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes an ACS controller 142. When the base stations 104 and 106 operate as a coordinating base station and a coordinated base station, respectively, the ACS controller 132 can perform the coordinating functionality, and the ACS 142 can performed the coordinated functionality, both discussed below.

With continued reference to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE-side ACS controller 152 configured to manage concurrent communications with a group of base stations, such an ACS including the base stations 104 and 106. For example, the ACS controller 152 can implement a suitable soft-combining functionality to process downlink data jointly received from multiple base stations, beam management to receive downlink data from multiple base stations and/or transmit uplink data to multiple base stations, frequency multiplexing for joint transmission and/or reception, etc.

Referring to FIG. 1B, an example wireless communication system 100B is similar to the wireless communication network 100A of FIG. 1A, but in this configuration the base station 104 forms an ACS 126, or a group of another suitable type, and includes more than two base stations in the group. The ACS 126 in this example configuration includes base stations 104, 106, and 108. The base station 104 does not have a wired connection with either base station 106 or the base station 108. To coordinate the formation and operation of the ACS 126, the base station 104 uses the wireless backhaul link 122 to communicate with the base station 106, and a wireless backhaul link 123 to communicate with the base station 108. Depending on the implementation, the links 122 and 123 can operate according to the same RAT or different RATs.

Figure 2A:
FIG. 2A schematically illustrates configuration and subsequent downlink transmissions in the system of FIG. 1A.
Figure 2A:
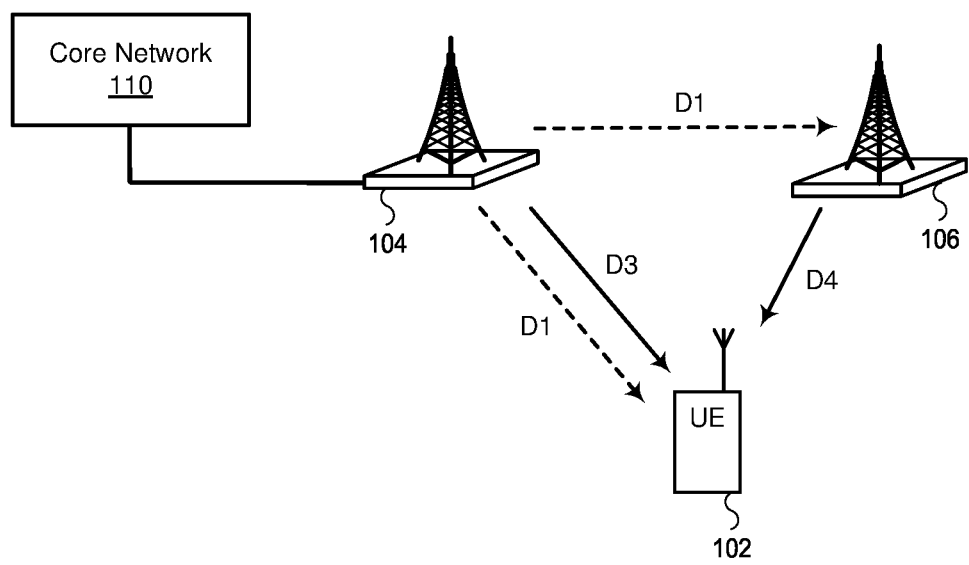

Next, FIG. 2A schematically illustrates a downlink joint transmission scenario 200 that can be implemented in the system 100A. The base station 104 operates as a coordinating base station and first transmits a signal D1 to the UE 102 (transmission 202A) and the base station 106 (transmission 202B), which operates as a coordinated base station. In one implementation, the base station 104 broadcasts or multicasts signal D1 on a channel which both the UE 102 and the base station 106 currently monitor, and the transmissions 202A and 202B are one and the same. In another implementation, the base station 104 applies frequency multiplexing, and the transmission 202A occurs on a channel which the UE 102 monitors but the base station 106 does not monitor, and the transmission 202B conversely occurs on another channel which the base station 106 monitors but the UE 102 does not monitor. Still further, the base station 104 in some implementations or scenarios can apply beam diversity to use the same time-frequency resource for the transmissions 202A and 202B, but convey different information to the UE 102 and the base station 106. More particularly, the base station 104 can use beam diversity to also transmit data in accordance with an Alamouti scheme or another applicable data diversity scheme.

Signal D1 can include control information such time and frequency allocation for the subsequent joint transmission via signals D3 and D4. The subsequent transmission can be a single transmission or a recurring transmission, and the control information accordingly can schedule one or multiple joint transmissions. The control information also can specify a modulation and coding scheme (MCS) for the subsequent joint transmission. In some implementations, the control information in signal D1 identifies the beam diversity scheme according to which the base stations 104 and 106 transmits downlink data in the signals D3 and D4, respectively. Still further, the control information in signal D1 can specify a frequency multiplexing scheme for the transmission of the signals D3 and D4. More generally, the control information can include any suitable indication of how the base stations 104 and 106 will generate subsequent one or more downlink transmissions to the UE 102.

To transmit signal D1, the base station 104 can use a wireless backhaul link between the base stations 104 and 106. The base stations 104 and 106 can determine the parameters of the wireless backhaul link via signaling that occurs prior to the transmission 202B. The base station 104 in another scenario uses signal D1 to establish a wireless backhaul link between the base stations 104 and 106. In an example scenario, the base station 104 operates an IAB-donor, and the base station 106 operates as an IAB-node, for the purposes of establishing a wireless backhaul link between these base stations. The wireless backhaul link can have an MCS different from the MSC of the wireless link between the base station 104 and the UE 102 or between the wireless link between the base station 106 and the UE 102.

In some scenarios, signal D1 also includes data $d_1$ intended for the UE 102. The base station 106 can retrieve the data from signal D1 and transmit data $d_1$ in a signal D4 to the UE 102. The group 124 thus can use the respective radio interfaces between the base station 104 and the UE 102, the base station 106 and the UE 102, and the base stations 104, 106 for redundancy in the downlink transmission of data $d_1$. The UE 102 can buffer data $d_1$ received as a part of signal D1 and then select one of the versions of received data $d_1$ based on the result of error checking, for example. The UE 102 alternatively can combine data $d_1$ received directly from the base station 104 as a part of signal D1 with data $d_1$ which the base station 106 forwarded to the UE 102 as a part of signal D4. To this end, the UE 102 can apply any suitable soft-combination technique.

Further, to reduce the error rate, the base station 104 can apply a diversity coding technique such as Alamouti coding and include different versions of data $d_1$ in the transmissions 202A and 202B. More particularly, the group 124 can transmit complex conjugates $d_1$ and $d_1^*$ to the UE 102 in the signals D1 and D4, so that the UE 102 can more accurately retrieve data $d_1$ from the signals D1 and D4. The group 124 also can transmit three instances of data $d_1$ to the UE 102 via the signals D1, D3, and D4. The group 124 can apply respective diversity coding each of the three transmissions, and the UE 102 can soft-combine the received instances of data $d_1$ accordingly.

In some scenarios, the transmission 202B also includes data $d_2$, or a particular diversity coding of the data $d_2$, for subsequent joint transmission to the UE 102 via the signals D3 and D4. The base station 104 in this scenario can transmit data $d_2$ in a signal D3, and the base station 106 can transmit data $d_2$ in signal D4 (alone or along with data $d_1$), in accordance with the parameters the base station 104 previously specified in signal D1. In yet another scenario, the base station 104 provides data $d_2$ to the base station 106 in a separate transmission subsequent to the transmission 202B. The base stations 104 and 106 then transmit data $d_2$ in the signals D3 and D4 as discussed above.

The base stations 104 and 106 alternatively can transmit different data via the signals D3 and D4, so as to improve throughput. The UE 102 in these cases can combine the data accordingly, e.g., by appending the data in signal D4 to the data in signal D3.

In some implementations, the signals D3 and D4 include only data (e.g., data $d_2$) and do not include any control information. The corresponding transmissions 204 and 206 accordingly can occur on data channels only. In another implementation, however, one or more of the signals D3 and D4 include control information to specify one or more resources for joint communication subsequent to the signals D3 and D4.

Figure 2B:
FIG. 2B schematically illustrates configuration and subsequent uplink transmissions in the system of FIG. 1A.
Figure 2B:
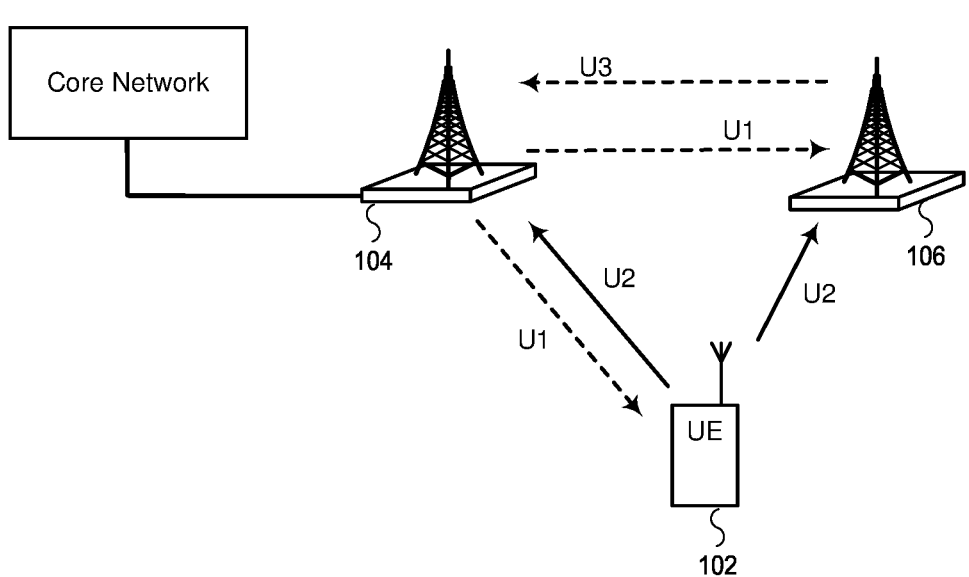

Referring to FIG. 2B, an uplink joint transmission scenario 220 also can be implemented in the system 100A. The base station 104 and the base station 106 operate as a coordinating base station and a coordinated base station, respectively. According to this scenario, the base station 104 first transmits a signal U1 to the UE 102 (transmission 222A) and the base station 106 (transmission 222B). Similar to signal D1 discussed above, the base station 104 can broadcast or multicast signal U1 on a channel which both the UE 102 and the base station 106 currently monitor, in which case the transmissions 222A and 222B are one and the same. Alternatively, the transmission 222A occurs on a channel which the UE 102 monitors but the base station 106 does not monitor, and the transmission 222B occurs on another channel which the base station 106 monitors but the UE 102 does not monitor. Also similar to signal D1, the base station 104 can apply beam diversity to use same time-frequency resources for the transmissions 222A and 222B. In this case, the transmissions 222A and 22B need not include the same information, and the base station 104 can use directionality to include UE-specific information in the transmission 222A, and base-station-specific information in the transmission 222B.

Signal U1 can include control information for a signal U2 that includes an uplink transmission 224A from the UE 102 to the base station 104, and an uplink transmission 224B from the UE 102 to the base station 106. The control information can specify one or more time-frequency resources, and/or the include a joint uplink grant for the transmissions 224A and 224B. Further, the control information can include another uplink grant for the base station 106 to use when forwarding data from the UE 102 to the base station 104, via a signal U3. The control information also can specify other parameters for the wireless backhaul between the base stations 102 and 104, which as discussed above can have a different MCS from the wireless links between the base stations and the UE 102. Further, the base stations 104 and 106 can use a wireless backhaul which the base station 104 or 106 configured prior to transmitting signal U1.

The UE 102 can transmit data $d_3$ in accordance with the control information, such as the configured grant, specified in signal U1. As illustrated in FIG. 2B, the UE 102 transmits data $d_3$ in a signal U2 to the base station 104 (transmission 224A) and the base station 106 (transmission 224B). The base station 106 then can forward data $d_3$ in a signal U3 to the base station 104, and the base station 104 can soft-combine the instances of the received data. Depending on the implementation or scenario, the transmissions 224A and 224B can be one and the same, or the UE 102 can use frequency or beam diversity to transmit different information in the transmission 224A and 224B. For example, the UE 102 can apply Alamouti diversity coding to transmit data $d_3$ as respective complex conjugates to the base stations 104 and 106.

The devices 102, 104, and 106 can perform both uplink and downlink joint transmissions in accordance with the scenarios of FIGS. 2A and 2B. For example, the base station can generate a signal D1 (transmissions 202A, 202B of FIG. 2A) that indicates not only resources and parameters for subsequent one or more downlink joint transmissions from the group 124 to the UE 102 but also resources and parameters for subsequent one or more uplink joint transmissions from the UE 102 to the group 124.

Figure 3A:
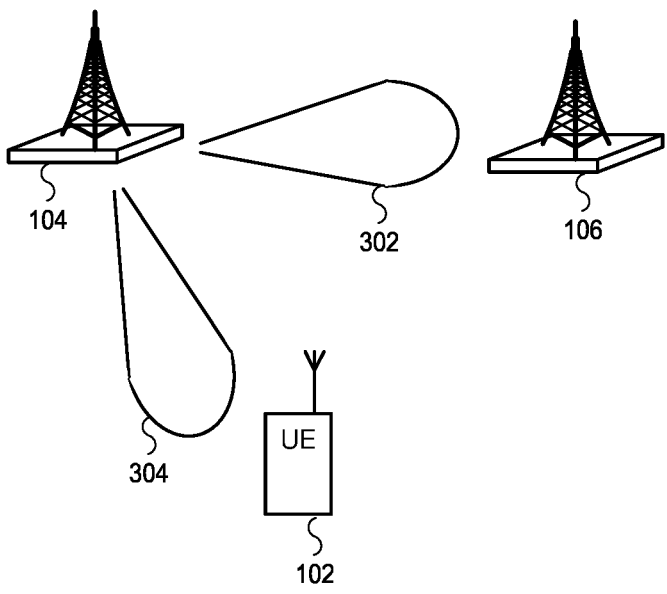
FIG. 3A schematically illustrates beamforming for downlink transmissions in the system of FIG. 1A.

For further clarity, FIG. 3A schematically illustrates beamforming for downlink transmissions in the system of FIG. 1A. In a scenario 300, the base station 104 generates beams 302 and 304 to directed toward the base station 106 and the UE 102, respectively. The beams 302 and 304 can share the same time and frequency resources (e.g., as an omnidirectional beam, a single wide beam, or multiple narrow beams). Referring back to FIGS. 2A and 2B, the base station 104 can use the beams 302 and 304 to generate the transmissions 202A and 202B, respectively. In another scenario, the base station 104 can use the beams 302 and 304 to generate the transmissions 222A and 222B, respectively. Alternatively, beams 304 and 306 can share the time and frequency resources and can correspond to the transmissions 204 and 206, respectively.

Figure 3B:
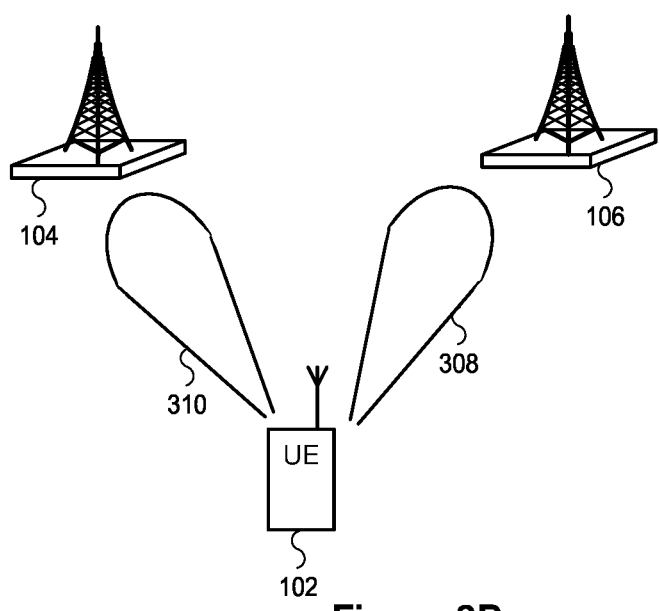
FIG. 3B schematically illustrates beamforming for uplink transmissions in the system of FIG. 1A.

Now referring to FIG. 3B, the UE 102 in a scenario 320 generates beams 308 and 310 directed toward the base station 106 and the UE 102, respectively. The beams 308 and 310 can share the same time and frequency resources (e.g., as an omnidirectional beam, a single wide beam, or multiple narrow beams). The UE 102 uses the beams 308 and 310 to generate the transmissions 224A and 224B, for example. Alternatively, the base station 104 can receive the transmissions 224A and 226 over the beams 308 and 312, respectively.

Next, several example methods that can be implemented in the devices of FIGS. 1A and 1B are discussed with reference to FIGS. 4-10. These methods can be implemented as sets of instructions stored on a computer-readable medium and executable by processing hardware such as one or more general-purpose central processing units (CPUs) or specialized processors.

FIG. 4 illustrates a flow diagram of an example method 400 for coordinating joint transmission of downlink data to a UE using an ACS. The method can be implemented in a coordinating base station such as the base station 104. The method begins at block 402, where the coordinating base station generates a configuration for an ACS that includes the base station 104 and at least one other coordinated base station. For example, the coordinated base station can be the base station 106. The configuration can include such parameters as a schedule for joint transmission and/or joint reception, an MCS for the wireless backhaul between the coordinating base station and the at least one coordinated base station, another (in some cases different) MCS for the wireless links between the base stations in the ACS and the UE, a beam diversity scheme, a frequency diversity scheme, etc.

Next, at block 404, the coordinating base station transmits the configuration to the coordinated base station via a radio interface (e.g., signal D1 in FIG. 2A). The coordinating base station in some implementations uses the BAP protocol to configure the coordinating base station as an IAB-donor and the coordinated base station as an IAB-node.

At block 406, the coordinating base station performs a joint transmission of downlink data to the UE (i) directly via the radio interface to the UE (e.g., signal D3) and (ii) indirectly via the coordinated base station (e.g., the signals D1 and D4). In particular, the coordinating base station can transmit the data to the coordinated base station via the wireless backhaul, and the coordinated base station in turn can transmit the data via the radio interface to the UE.

FIG. 5 depicts a flow is diagram of an example method 500 for coordinating join reception of uplink data using an ACS. The method can be implemented in a coordinating base station such as the base station 104. At block 502, the coordinating base station generates a configuration for an ACS that includes the base station 104 and at least one other coordinated base station. Similar to the configuration for joint transmission, the configuration for joint reception at the ACS can include parameters for a wireless backhaul between the coordinating base station and the coordinated base station. Also similar to the configuration for joint transmission, the configuration generated at block 504 can include an MCS for the radio interface between the base stations and the same or different MCS for the radio interfaces between the base stations in the ACS and the UE. Unlike the configuration for joint transmission, however, the configuration for joint reception can include a joint uplink grant for the UE to utilize when transmitting uplink signals to the base stations, and a separate uplink grant for the coordinated base station to utilize when forwarding data from the UE to the coordinating base station.

Next, at block 504, the coordinating base station transmits the configuration to the coordinated base station via a radio interface (e.g., signal U1 in FIG. 2B). The coordinating base station in some implementations uses the BAP protocol to configure the coordinating base station as an IAB-donor and the coordinated base station as an IAB-node.

At block 506, the coordinating base station performs a joint reception of uplink data from the UE (i) directly via the radio interface with the UE (e.g., signal U2) and (ii) indirectly via the coordinated base station (e.g., the signals U2 and U3). The coordinating base station then can combine the data included in the signals U2 and U3. The combining can proceed in accordance with a diversity encoding scheme such as Alamouti encoding, for example.

Referring to FIG. 6, an example method 600 for performing joint reception of downlink data using an ACS can be implemented in a UE such as the UE 102 for example. At block 602, the UE receives a configuration for an ACS that includes two or more base stations. For example, the UE can receive the configuration from a coordinating base station (e.g., signal D1 in FIG. 2A), and the configuration can pertain to an ACS that includes the coordinating base station and at least one other coordinated base station.

At block 604, the UE performs joint reception of downlink data from the coordinating base station (e.g., signal D3) and the at least one coordinated base station (e.g., signal D4). Next, at block 606, the UE then soft-combines the data received at block 604. In some scenarios, the UE also can soft-combine the data received along with the configuration at block 602 in a signal from the coordinating base station (e.g., signal D1).

FIG. 7 is a flow diagram of an example method 700 which the UE of FIG. 1A can implement to transmit uplink data to an ACS or another suitable group of base station. At block 702, the UE receives a configuration for an ACS that includes two or more base stations (e.g., signal U1 in FIG. 2B). Similar to block 602, the UE can receive the configuration from a coordinating base station, and the configuration can pertain to an ACS that includes the coordinating base station and at least one other coordinated base station.

At block 704, the UE transmits uplink data to the coordinating base station (e.g., the transmission 224A of signal U2) and the at least one coordinated base station (e.g., the transmission 224B of signal U2). Depending on the implementation, the UE can generate a single non-directional transmit signal U2 to the base stations in the ACS, or multiple directional transmissions to the respective base stations (e.g., via the beams 308 and 310 of FIG. 3B). In the latter case, the UE can apply a diversity encoding scheme such as Alamouti encoding to the transmissions.

More generally, the configuration received at block 602 or 702 can apply to any suitable grouping of base stations for concurrent communication with a UE, such as joint transmission/reception or dual connectivity during temporary disruptions of connectivity between one of the base stations and the core network.

For further clarity. FIG. 8 illustrates a flow diagram of an example method 800 for communicating with a UE, which can be implemented in a coordinating base station such as the base station 104. At block 802, the coordinating base station transmits, via a radio interface to a coordinated base station, a configuration for concurrent communication between the UE and a group of base station including the coordinating base station and the coordinated base station (e.g., the transmission 202B of signal D1, the transmission 222B of signal U1, block 404, block 504). In some implementations, the coordinating base station also transmits this configuration to the UE, at the same time or a different time. Further, the coordinating base station can configure a wireless backhaul between the coordinating base station and the coordinated base station at block 802 or, alternatively, prior to generating the configuration for concurrent communication with the UE.

At block 804, the coordinating base station communicates with the UE directly via the radio interface, in the downlink or uplink direction (e.g., the transmission 204 of signal D3, the transmission 224A of signal U2) as well as via radio interface between the base stations, via the coordinated base station (e.g., the transmission 202B of signal D1, the transmission 226 of signal U3).

Next, FIG. 9 illustrates a flow diagram of an example method 800 for communicating with a UE, which can be implemented in a coordinated base station such as the base station 106. At block 902, the coordinated base station receives, via a radio interface from a coordinating base station, a configuration for concurrent communication between the UE and a group of base station including the coordinating base station and the coordinated base station (e.g., the reception 202B of signal D1, the reception 222B of signal U1, block 404, block 504).

At block 904, the coordinated base station communicates data between the UE and the coordinating base station in accordance with the configuration received at block 902, in the downlink or the downlink (e.g., the transmission 202B of signal D1 and the transmission 206 of signal D4) or uplink (e.g., the transmission 224B of signal U2 and the transmission 226 of signal U3) direction. The coordinated base station communicates with the UE 102 as well as with the coordinating base station via the same radio interface or different radio interfaces, but in any case does not communicate with the coordinating base station via a wired backhaul link.

Finally. FIG. 10 illustrates a flow diagram of an example method 1000 for communicating with a group of base stations, which can be implemented in the UE of FIG. 1A.

At block 1002, the UE receives a configuration for communicating with a group of two or more base stations (e.g., signal D1 in FIG. 2A, signal U1 in FIG. 2B). At block 1004, the UE communicates with the group of base station in accordance with the received configuration. More particularly, at block 1006, the UE can transmit first data via the radio interface to the coordinating base station directly (e.g., the transmission 224A of signal U2), and second data to the coordinating base station via the radio interface and the coordinated base station (e.g., the transmission 224B of signal U2). At block 1008, the UE receives first data via the radio interface directly from the coordinating base station (e.g., the transmission 204 of signal D3), and second data from the coordinating base station via the radio interface and the coordinated base station (e.g., the transmission 206 of signal D4). The UE then can combine (e.g., soft-combine) the received data as discussed above.

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of examples reflects a variety of the embodiments explicitly contemplated by the present disclosure.

Example 1. A method in a first base station for communicating with UE via the first base station and a second base station comprises: transmitting, via a radio interface to the second base station, a configuration for concurrent communication between the UE and a group of base stations including the first base station and the second base station; and communicating, by processing hardware, data (i) directly over a radio interface directly with the UE, and (ii) indirectly with the UE over a the wireless backhaul link and via the second base station.

Example 2. The method of example 1, further comprising configuring, by the processing hardware the second base station to operate in an Active Coordination Set (ACS) with the first base station, the ACS configured to provide joint transmission and/or joint reception to the UE.

Example 3. The method of example 1 or 2, further comprising configuring, by the processing hardware, the first base station to operate as an integrated access and backhaul (IAB)-donor and the second base station to operate as an JAB-node.

Example 4. The method of any of the preceding examples, wherein the transmitting includes transmitting the configuration to the UE and the second base station, over a shared radio link.

Example 5. The method of any of the preceding examples, wherein the transmitting includes transmitting, to second base station in a signal including the configuration, data for downlink transmission to the UE.

Example 6. The method of any of the preceding examples, wherein the transmitting includes: configuring one or more subsequent downlink (DL) transmissions from the group of base stations to the UE.

Example 7. The method of example 6, wherein the configuring incudes indicating, for each of the one or more subsequent DL transmissions, one or more of: (i) a time-frequency resource, (ii) a modulation and coding scheme (MCS), (iii) a beam multiplexing scheme, (iv) a diversity coding scheme, or (v) a frequency multiplexing scheme.

Example 8. The method of any of the preceding examples, wherein the communicating includes: transmitting DL data over a data channel, jointly with the second base station.

Example 9. The method of any of the preceding examples, wherein the communicating includes receiving a first uplink (UL) transmission via the radio link and a second UL transmission from the second base station.

Example 10. The method of example 9, further comprising soft-combining the first UL transmission with the second UL transmission to obtain UL data transmitted from the UE.

Example 11. The method of example 9 or 10, further comprising buffering, by the processing hardware, the first UL transmission until the second UL transmission is received.

Example 12. The method of any of examples 9-11, wherein transmitting the configuration includes: transmitting an uplink grant for the UE, wherein the first uplink UL transmission occurs in accordance with the uplink grant.

Example 13. The method of example 12, wherein the uplink is a first uplink grant; the method further comprising: providing a second uplink grant to the second base station, wherein the second uplink UL transmission occurs in accordance with the second uplink grant.

Example 14. A method for supporting concurrent communication between a UE and a group of base stations including a first base station and the second base station, the method implemented in the second base station and comprising: receiving, from the first base station via a radio interface, a configuration for concurrent communication between the UE and the group of base stations; and communicating, by processing hardware and in accordance with the configuration, data between the first base station and the UE, including: communicating the data with the first base station via the radio interface, and communicating the data with the UE via a radio link between the second base station and the UE.

Example 15. The method of example 14, further comprising: configuring, by the processing hardware and in accordance with the configuration, the second base station to operate in an Active Coordination Set (ACS) with the first base station, the ACS configured to provide joint transmission and/or joint reception to the UE.

Example 16. The method of example 13 or 14, further comprising: configuring, by the processing hardware, the second base station to operate as an IAB-node, wherein the first base station operates as an IAB-donor.

Example 17. The method of any of examples 14-16, further comprising receiving, from the first base station in a signal including the configuration, data for downlink transmission to the UE.

Example 18. The method of example 17, wherein the communicating includes transmitting the data to the UE via the radio link.

Example 19. The method of any of examples 14-18, wherein the configuration indicates, for each subsequent DL transmissions, one or more of: (i) a time-frequency resource, (ii) an MCS, (iii) a beam multiplexing scheme, or (iv) a frequency multiplexing scheme.

Example 20. The method of any of examples 14-19, wherein the configuration indicates an uplink grant for transmitting, via the radio interface, a subsequent UL transmission from the UE.

Example 21. The method of any of examples 14-20, wherein the communicating includes: receiving a UL transmission from the UE via the radio link; and transmitting the UL transmission to the first base station via the radio interface.

Example 22. A base station comprising processing hardware and configured to implement a method according to any of the preceding examples.

Example 23. A method in a user equipment (UE) for communicating with a group of base stations including a first base station and a second base stations, the method comprising: receiving, via a radio interface, a configuration for concurrent communication between the UE and group of base stations; and communicating, by processing hardware and in accordance with the configuration, (i) first data via a first radio link between the UE and the first base station, and (ii) second data via a second radio link between the UE and the second base station, wherein the first data is combined with the second data at the UE or at the first base station.

Example 24. The method of example 23, further comprising: configuring, by the processing hardware and in accordance with the configuration, the UE to communicate with the group of base station as an Active Coordination Set (ACS) that provides joint transmission and/or joint reception to the UE.

Example 25. The method of example 23 or 24, wherein the configuration configures one or more subsequent DL transmissions from the group of base stations to the UE.

Example 26. The method of example 25, wherein the configuration indicates, for each of the one or more subsequent DL transmissions, one or more of: (i) a time-frequency resource. (ii) an MCS. (iii) a beam multiplexing scheme, or (iv) a frequency multiplexing scheme.

Example 27. The method of any of examples 23-26, wherein the configuration configures one or more subsequent UL transmissions from the UE to the group of base stations.

Example 28. The method of example 27, wherein the configuration includes an uplink grant for UL transmission to the first base station.

Example 29. The method of any of examples 22-28, wherein: the first data is first DL data, and the second data is second DL data; and wherein the communicating includes: soft-combining, by the processing hardware, the first DL data with the second DL data.

Example 30. The method of example 29, wherein the soft-combining includes further using initial DL data received in a signal that includes configuration.

Example 31. The method of example 29, wherein the soft-combining includes applying an Alamouti diversity decoding scheme.

Example 32. The method of any of examples 23-31, wherein the first data is first UL data, and the second data is second UL data.

Example 33. The method of any of example 32, wherein: the first data and the second data correspond to a single transmission to the group of base stations.

Example 34. A UE comprising processing hardware and configured to implement of any of examples 23-33.

What is claimed is:

1. A method in a first base station for communicating with a user equipment (UE) via the first base station and a second base station, the method comprising:
   transmitting, via a wireless backhaul link to the second base station, a configuration for concurrent communication between the UE and a group of base stations including the first base station and the second base station,
      the configuration directing the second base station to operate in an Active Coordination Set (ACS) with the first base station, the ACS configured to provide joint transmission and/or joint reception to the UE, and
      the configuration indicating a time-frequency resource for a second subsequent downlink transmission from the second base station to the UE;
   configuring the first base station to operate as an integrated access and backhaul (IAB)-donor and the second base station to operate as an IAB-node; and
   communicating data with the UE (i) directly over a radio interface using the time-frequency resource, and (ii) over the wireless backhaul link and via the second base station.

2. The method of claim 1, wherein the transmitting includes:

transmitting the configuration to the UE and the second base station, over a shared radio link.

3. The method of claim 1, wherein the transmitting includes:
   transmitting, to the second base station in a signal including the configuration, data for the second subsequent downlink transmission to the UE.

4. The method of claim 1, wherein the configuration indicates, for at least one of a first subsequent downlink transmission from the first base station or the second subsequent downlink transmission from the second base station, one or more of:
   (i) a modulation and coding scheme (MCS),
   (ii) a beam multiplexing scheme, or
   (iii) a frequency multiplexing scheme.

5. The method of claim 1, wherein the communicating includes:
   jointly transmitting, with the second base station, downlink data over a data channel.

6. The method of claim 1, wherein the communicating includes:
   receiving a first uplink transmission via the radio interface and a second uplink transmission from the second base station via the wireless backhaul link, the method further comprising:
   soft-combining the first uplink transmission with the second uplink transmission to obtain uplink data transmitted from the UE.

7. The method of claim 6, further comprising:
   buffering the first uplink transmission until the second uplink transmission is received.

8. A method for supporting concurrent communication between a user equipment (UE) and a group of base stations including a first base station and the second base station, the method implemented in the second base station and comprising:
   receiving, from the first base station via a radio interface, a configuration for concurrent communication between the UE and the group of base stations including an indication of a time-frequency resource for a second subsequent downlink transmission to be transmitted from the second base station jointly with a first subsequent downlink transmission from the first base station to the UE;
   configuring, in accordance with the configuration, the second base station to operate in an Active Coordination Set (ACS) with the first base station, the ACS configured to provide joint transmission and/or joint reception to the UE;
   configuring the second base station to operate as an integrated access and backhaul (IAB)-node with the first base station as a corresponding IAB-donor; and
   communicating, in accordance with the configuration, data between the first base station and the UE, including:
      communicating the data with the first base station via the radio interface, and
      communicating the data with the UE directly over a radio link between the second base station and the UE.

9. The method of claim 8, further comprising:
   receiving, from the first base station in a signal including the configuration, data for the second subsequent downlink transmission to the UE; and
   transmitting the data to the UE via the radio link.

10. The method of claim 8, wherein the configuration indicates, for at least one of the first subsequent downlink transmission or the second subsequent downlink transmission, one or more of:

(i) a modulation and coding scheme (MCS), (ii) a beam multiplexing scheme, or (iii) a frequency multiplexing scheme.

11. The method of claim 8, wherein the configuration indicates an uplink grant for transmitting, via the radio interface, a subsequent uplink transmission received from the UE over the radio link.

12. The method of claim 8, wherein the communicating includes:

receiving an uplink transmission from the UE via the radio link; and transmitting the uplink transmission to the first base station via the radio interface.

13. An apparatus in a first base station for communicating with a user equipment (UE) via the first base station and a second base station, comprising:

a transceiver;

a memory; and a processor coupled to the memory and the transceiver, the processor configured to:

transmit, via a wireless backhaul link to the second base station, a configuration for concurrent communication between the UE and a group of base stations including the first base station and the second base station, the configuration directing the second base station to operate in an Active Coordination Set (ACS) with the first base station, the ACS configured to provide joint transmission and/or joint reception to the UE, and the configuration indicating a time-frequency resource for a second subsequent downlink transmission from the second base station to the UE;

configure the first base station to operate as an integrated access and backhaul (IAB)-donor and the second base station to operate as an IAB-node; and communicate data with the UE (i) directly over a radio interface using the time-frequency resource, and (ii) over the wireless backhaul link and via the second base station.

14. The apparatus of claim 13, wherein the processor is further configured to:

transmit the configuration to the UE and the second base station, over a shared radio link.

15. The apparatus of claim 13, wherein the processor is further configured to:

transmit, to the second base station in a signal including the configuration, data for the second subsequent downlink transmission to the UE.

16. The apparatus of claim 13, wherein the processor is further configured to:

jointly transmit, with the second base station, downlink data over a data channel.

17. The apparatus of claim 13, wherein the processor is further configured to:

receive a first uplink transmission via the radio interface and a second uplink transmission from the second base station via the wireless backhaul link; and soft-combine the first uplink transmission with the second uplink transmission to obtain uplink data transmitted from the UE.

18. The apparatus of claim 17, wherein the processor is further configured to:

buffer the first uplink transmission until the second uplink transmission is received.

19. An apparatus for supporting concurrent communication between a user equipment (UE) and a group of base stations including a first base station and the second base station, the apparatus implemented in the second base station and comprising:

a transceiver;

a memory; and a processor coupled to the memory and the transceiver, the processor configured to:

receive, from the first base station via a radio interface, a configuration for concurrent communication between the UE and the group of base stations including an indication of a time-frequency resource for a second subsequent downlink transmission to be transmitted from the second base station jointly with a first subsequent downlink transmission from the first base station to the UE;

configure, in accordance with the configuration, the second base station to operate in an Active Coordination Set (ACS) with the first base station, the ACS configured to provide joint transmission and/or joint reception to the UE;

configure the second base station to operate as an integrated access and backhaul (IAB)-node with the first base station as an IAB-donor; and communicate, in accordance with the configuration, data between the first base station and the UE, including to:

communicate the data with the first base station via the radio interface, and communicate the data with the UE directly over a radio link between the second base station and the UE.

20. The apparatus of claim 19, wherein the processor is further configured to:

receive, from the first base station in a signal including the configuration, data for the second subsequent downlink transmission to the UE; and transmit the data to the UE via the radio link.

21. The apparatus of claim 19, wherein the configuration indicates, for at least one of the first subsequent downlink transmission or the second subsequent downlink transmission, one or more of:

(i) a modulation and coding scheme (MCS), (ii) a beam multiplexing scheme, or (iii) a frequency multiplexing scheme.

22. The apparatus of claim 19, wherein the configuration indicates an uplink grant for transmitting, via the radio interface, a subsequent uplink transmission received from the UE over the radio link.

23. The apparatus of claim 19, wherein the processor is further configured to:

receive an uplink transmission from the UE via the radio link; and transmit the uplink transmission to the first base station via the radio interface.

\* \* \* \* \*